United States Patent
Slamka (10) Patent No.: US 9,201,143 B2
(45) Date of Patent: Dec. 1, 2015

(54) ASSISTED GUIDANCE NAVIGATION

(75) Inventor: Milan Slamka, Camas, WA (US)

(73) Assignee: ECHO-SENSE INC., Camas, WA (US)

( * ) Notice: Subject to any disclaimer, the term of this patent is extended or adjusted under 35 U.S.C. 154(b) by 242 days.

(21) Appl. No.: 12/870,458

(22) Filed: Aug. 27, 2010

(65) Prior Publication Data

US 2012/0053826 A1 Mar. 1, 2012

Related U.S. Application Data

(60) Provisional application No. 61/238,158, filed on Aug. 29, 2009.

(51) Int. Cl.

| | | |
|---|---|---|
| *G01S 15/93* | (2006.01) | |
| *G01S 19/14* | (2010.01) | |
| *G01C 21/16* | (2006.01) | |
| *G01C 21/20* | (2006.01) | |
| *A61H 3/06* | (2006.01) | |

(52) U.S. Cl.
CPC ............. *G01S 15/93* (2013.01); *G01C 21/165* (2013.01); *G01C 21/20* (2013.01); *G01S 19/14* (2013.01); *A61H 3/061* (2013.01); *A61H 2201/1604* (2013.01); *A61H 2201/165* (2013.01)

(58) Field of Classification Search
CPC ....... G01S 15/93; G01S 19/14; G01C 21/165; G01C 21/20; A61H 3/061; A61H 2201/1604; A61H 2201/165
USPC ..................... 701/301; 434/112; 180/167, 169
See application file for complete search history.

(56) References Cited

U.S. PATENT DOCUMENTS

| | | | |
|---|---|---|---|
| 3,366,922 A | 1/1968 | Kay | |
| 4,020,446 A | 4/1977 | Iida et al. | |
| 4,292,678 A | 9/1981 | Kay | |
| RE32,252 E | 9/1986 | Kay | |
| 4,713,669 A | 12/1987 | Shuch | |
| 4,761,770 A | 8/1988 | Kim et al. | |
| 4,907,136 A | 3/1990 | Jorgensen | |
| 4,928,101 A * | 5/1990 | Favors | 340/943 |
| 5,032,836 A | 7/1991 | Ono et al. | |
| 5,107,467 A | 4/1992 | Jorgensen et al. | |
| 5,469,956 A | 11/1995 | Greve et al. | |
| 5,470,233 A | 11/1995 | Fruchterman et al. | |
| 5,495,534 A * | 2/1996 | Inanaga et al. | 381/310 |
| 5,508,699 A * | 4/1996 | Silverman | 340/944 |
| 5,687,136 A * | 11/1997 | Borenstein | 367/116 |

(Continued)

OTHER PUBLICATIONS

Global Sources—Product Search: Camera sunglasses, http://www.globalsources.com/gsol/GeneralManager?point_search=on&page=search%2FProductSearchResults&product_search=on&supplier_search=off&article_search=off&type=new&search_what=1&query=Camera+sunglasses&point_id=3000000149681&catalog_id=2000000003844&from=&loc=t&AGG=N&supp_list=true&compare_table=true&action=GetPoint&action=DoFreeTextSearch&supp_list=true&compare_table=true&action=GetPoint&action=DoFreeTextSearch, 5 pages, accessed on Apr. 19, 2012.

(Continued)

*Primary Examiner* — Patrick Cicchino (74) *Attorney, Agent, or Firm* — Lane Powell PC (57) ABSTRACT

A navigation system helps users navigate through an environment by a plurality of sensors. The sensors include one or both of short and long range sensors that detect objects within the user's environment. Information obtained from the sensors' detection of objects within the user's environment can be used to help the user avoid colliding with objects within the environment and help navigate the user to a destination. The navigation system may provide the user with audible feedback regarding the objects with the user's environment and/or instructions regarding how to avoid colliding with an object and how to navigate to a destination.

21 Claims, 6 Drawing Sheets

(56) References Cited

U.S. PATENT DOCUMENTS

| | | | |
|---|---|---|---|
| 5,789,970 | A | 8/1998 | Denham |
| 5,854,843 | A | 12/1998 | Jacknin et al. |
| 5,878,154 | A | 3/1999 | Schimmelpfennig |
| 5,905,464 | A | 5/1999 | Lanciaux |
| 5,973,618 | A * | 10/1999 | Ellis .............................. 340/990 |
| 6,069,585 | A | 5/2000 | Lanciaux |
| 6,292,213 | B1 | 9/2001 | Jones |
| 6,452,572 | B1 | 9/2002 | Fan et al. |
| 6,469,956 | B1 | 10/2002 | Zeng |
| 6,502,032 | B1 | 12/2002 | Newman |
| 6,558,050 | B1 | 5/2003 | Ishibashi |
| 6,671,226 | B1 * | 12/2003 | Finkel et al. .................. 367/116 |
| 6,774,788 | B1 * | 8/2004 | Balfe ....................... 340/539.13 |
| 6,936,528 | B2 | 8/2005 | Koo et al. |
| 7,054,226 | B1 | 5/2006 | Hickling |
| 7,336,226 | B2 * | 2/2008 | Jung et al. ................. 342/357.52 |
| 7,598,976 | B2 * | 10/2009 | Sofer et al. ...................... 348/62 |
| 7,806,525 | B2 | 10/2010 | Howell |
| 2002/0005778 | A1 * | 1/2002 | Breed et al. ................... 340/435 |
| 2002/0194005 | A1 * | 12/2002 | Lahr ............................. 704/271 |
| 2003/0014186 | A1 | 1/2003 | Adams, Jr. et al. |
| 2003/0144814 | A1 * | 7/2003 | Hama et al. ................... 702/159 |
| 2005/0198063 | A1 | 9/2005 | Thomas et al. |
| 2005/0208457 | A1 * | 9/2005 | Fink et al. ..................... 434/112 |
| 2006/0098089 | A1 * | 5/2006 | Sofer .............................. 348/62 |
| 2007/0018890 | A1 | 1/2007 | Kulyukin |
| 2007/0212668 | A1 | 9/2007 | Takami et al. |
| 2007/0214277 | A1 | 9/2007 | Ahmed et al. |
| 2007/0238074 | A1 * | 10/2007 | Espenlaub et al. ............ 434/112 |
| 2008/0170118 | A1 * | 7/2008 | Albertson et al. .............. 348/46 |
| 2008/0218324 | A1 | 9/2008 | Li |
| 2008/0266669 | A1 | 10/2008 | Durner et al. |
| 2009/0122161 | A1 * | 5/2009 | Bolkhovitinov .............. 348/234 |
| 2009/0295918 | A1 | 12/2009 | Horovitz et al. |
| 2010/0296076 | A1 * | 11/2010 | Jiang et al. ................... 356/3.11 |

OTHER PUBLICATIONS

International Search Report dated Feb. 22, 2012, International Application No. PCT/US2011/061038, International Filing Date: Nov. 16, 2011.

Written Opinion dated Feb. 22, 2012, International Application No. PCT/US2011/061038, International Filing Date: Nov. 16, 2011.

International Search Report dated Jun. 26, 2013, International Application No. PCT/US2013/026915, International Filing Date: Apr. 2, 2013.

Written Opinion dated Jun. 26, 2013, International Application No. PCT/US2013/026915, International Filing Date: Apr. 2, 2013.

Final Office Action dated Aug. 20, 2014, U.S. Appl. No. 13/297,572, filed Nov. 16, 2011.

Office Action dated Mar. 27, 2015 U.S. Appl. No. 13/297,572, filed Nov. 16, 2011.

Office Action dated Mar. 11, 2015, U.S. Appl. No. 13/770,870, filed Feb. 19, 2013.

Office Action dated Sep. 8, 2015, U.S. Appl. No. 13/297,572, filed Nov. 16, 2011.

Office Action dated Sep. 22, 2015, U.S. Appl. No. 13/770,870, filed Feb. 19, 2013.

* cited by examiner

FIG. 1

Obstacle detection and location is a function of head orientation

Object   FIG. 2

ASSISTED GUIDANCE NAVIGATION

CROSS-REFERENCE TO RELATED APPLICATION

This application claims priority to U.S. Provisional Patent Application Ser. No. 61/238,158, filed on Aug. 29, 2009, entitled, "Apparatus and Method for Assisted Guidance Navigation," the contents of which are hereby incorporated by reference in their entirety.

FIELD

The present disclosure generally relates to portable navigation devices, and more specifically to electronic navigation systems for the visually-impaired.

BACKGROUND

Visual impairment affects millions of people worldwide and can be debilitating and isolating for those affects. Visually impaired and blind people face many problems with safety; home and personal management skills (e.g., identifying money, cooking, cleaning labeling foods and medications, etc.); employment skills; and other challenges. The visually impaired population can familiarize themselves with surroundings such as their homes, places of employment, and/or schools. However, these environments change over time and pose new, unexpected threats to the visually impaired. Additionally, new environments and unfamiliar routes to and from any environment are filled with obstacles that can harm the visually impaired person or make it very difficult for the visually impaired person to navigate successfully through the environments.

Assistive techniques and devices have been developed for the visually impaired. One technique is called echolocation in which a visually impaired person learns to interpret echoes of the sounds that bounce off of objects within the near vicinity of the visually impaired person. This process is similar to how a bat detects objects in the dark. Echolocation can be a very useful technique, but it is difficult to learn and can be inadequate in providing information sufficient to help a visually impaired person successfully navigate through an environment. Most often, the visually impaired find echolocation to be more burdensome than beneficial to help them navigate through an environment.

For example, echolocation has been performed by visually impaired people by tapping an assistive device, such as a cane, or his or her foot or hand on an object. The "echoes" received back or the sounds that emanate from the objects after being struck indicate to the visually impaired person some information about the objects, such as its size, shape, and/or contour. Echolocation may be used when a visually impaired person comes across one or more steps. By tapping a cane or his or her foot, the visually impaired person can interpret the sounds emanating from the step to determine the shape and depth of the step so that the visually impaired person can safely navigate the steps. However, this process is very difficult, inefficient, and time-consuming.

Accordingly, despite the benefits of known assisted guidance navigation for the visually-impaired, there remains a need for efficient, useful, user-friendly devices that do not compromise accuracy or utility.

SUMMARY

The present invention overcomes these and other shortfalls with the disclosed assisted guidance navigation systems and methods.

Aspects of the invention include a navigation system that comprises a plurality of short range navigation sensors and at least one long range navigation sensor. The short range navigation sensors detect objects within a user's environment and compile information relating to the objects within the user's environment and information relating to avoiding objects within the user's environment. The at least one long range navigation sensor compiles geographical information relating to the user's geographic location. The information relating to the objects within the user's environment, the information relating to avoiding objects within the user's environment, and the geographical information relating to the user's geographic location are provided to the user by a transducer.

Other aspects of the invention include a multi-user navigation system that comprises a first user having a first navigation system that helps navigate the first user within a first environment and a second user having a second navigation system that helps navigate the second user within a second environment. The first navigation system emits at least one first signal within the first environment to detect objects within the first environment and provide feedback to the first user that includes information relating to the objects within the first environment. The first signal includes a first unique identifier. The second navigation system emits at least one second signal within the second environment to detect objects within the second environment and provide feedback to the second user that includes information relating to the objects within the second environment. The at least one second signal includes a second unique identifier that is different than the first unique identifier. The at least one first signal is received by the first navigation system and identified as information relating to the first user based at least in part on the first unique identifier. The at least one second signal is received by the second navigation system and identified as information relating to the second user based at least in part on the second unique identifier.

In still other aspects of the invention, a multi-user navigation system comprises a first navigation system that helps navigate a first user within a first environment and an audible feedback that provides the user with information regarding objects within the first environment. The first navigation system emits at least a first signal having a first frequency and a second signal having a second frequency that is different than the first frequency within the first environment to detect objects within the first environment by the echo signals of the first signal and the second signal that are produced after the first signal and the second signal have encountered objects within the first environment. The echo signals are received by the first navigation system and the first signal and the second signal include a first unique identifier.

This section provides a general summary of the disclosed assisted guidance navigation, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Embodiments in accordance with the present disclosure provide systems and methods for assisted guidance navigation. The assisted guidance navigation may include any suitable embodiment including head-mounted devices (e.g., sunglasses or other eyewear, visors, headbands, etc.), chest or torso-mounted devices, guide-dog mounted devices, and any other devices that are suitable for assisting a user with guidance during navigation.

The disclosed assisted guidance navigation systems and methods assist a user within an environment and/or to a destination. For example, a user may wish to navigate within a neighborhood while going on a walk with no precise destination. With the disclosed assisted guidance navigation systems and methods, this user is able to avoid objects in his or her pathway that are on a path to collide with the user during travel, is able to identify objects within the user's short range environment, and also is able to geographically identify where the user is located (e.g., at which cross-streets the user is stopped or traveling near). In another example, the user wishes to travel to a particular destination. The disclosed assisted guidance navigation systems and methods guide the user to a particular destination with information received from a transducer (e.g., an ultrasonic transducer), while also assisting the user to avoid objects in his/her pathway and to identify objects within the near range environment of the user. Piezoelectric and/or electrodynamic transducers may be used. For example, speakers operating in a frequency range of 30-90 kHz may be used. Any suitable one or more transducer(s) can provide feedback to the user.

The user's environment includes a plurality of objects. The navigation system is capable of detecting all of the objects within the user's environment. The feedback that would be useful to the user does not include information relating to every object within the user's environment. Rather, the navigation system performs a prioritization of the objects within the user's environment to determine which objects are most important for the user to receive information about. The navigation system prioritizes the objects based on various characteristics such as whether the user is on a pathway to collide with the object, whether the object is in close proximity to the user, whether the object is positioned along a known pathway that the user is interested in pursuing (e.g., a user who is traveling along a planned route to a particular destination), etc. Such characteristics are detected by the various sensors in the navigation system. The navigation system may incorporate any number and type of rules associated with prioritizing the objects within a user's environment. For example, one rule is that all objects likely to collide with the user's known path are assigned a high priority level to provide the user with audible feedback on how to avoid these objects and stationary objects having a low likelihood of colliding with the user's path are assigned a low priority level and the user may not be provided with audible feedback about these objects.

Figure 1:
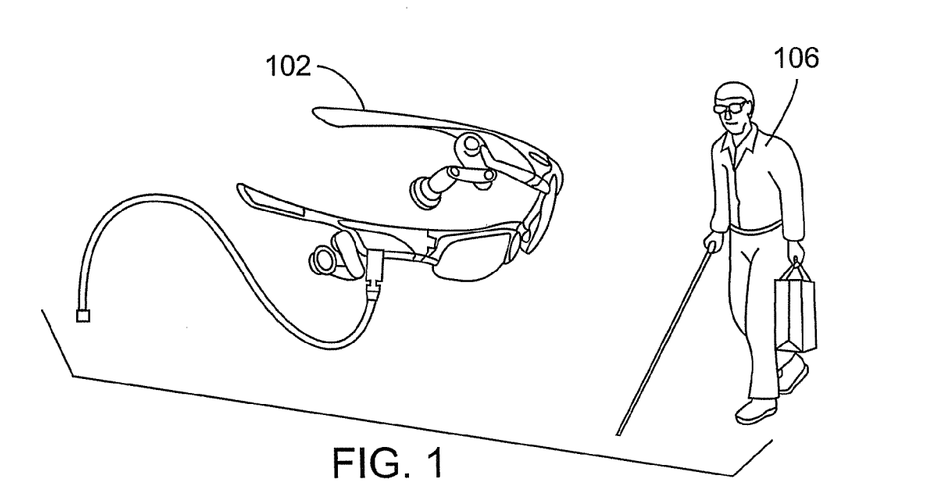
FIG. 1 illustrates an isometric view of an exemplary head-mounted embodiment of the disclosed assisted guidance navigation.

In an embodiment illustrated in FIG. 1, a navigation system 100 comprises a head-mounted device 102, such as sunglasses, with a sensor array 104 to detect objects within an environment of a user 106, and an external main processor module operatively coupled thereto to provide data (e.g., instructions) and optionally request information. The navigation system 100 may include a motion-detector (e.g., an accelerometer) to determine the user's movement, a location-determining device (e.g., a GPS) to determine the user's location, a camera to visually identify the objects, an audible feedback system, and optionally a voice recognition system to process voice commands. A transceiver can provide wireless communications, and a power supply can provide power to the electronic components. A processor operatively coupled to these components can identify a distance and direction of objects, retrieve object information by way of GPS coordinates, report features of the object responsive to captured voice commands, provide audible feedback and perform cellular communication functions in response to a user 106 directive or in automatic response to a condition, such as, a warning or danger event.

FIG. 1 depicts an exemplary embodiment of an assisted guidance navigation system 100 in a "sunglasses" embodiment. The sunglasses 100 can be used for assisted guidance navigation. The head-mounted device senses where objects are positioned within the user's environment and provides audible feedback to the user. The head-mounted device 100 (sunglasses, in this example) "looks" in the direction of the user when the user 106 moves his or her head and in conjunction with local sensor information (e.g., abrupt movements by way of an accelerometer) navigates the user 106 within the environment and/or to a destination in a safe manner.

Figure 2:
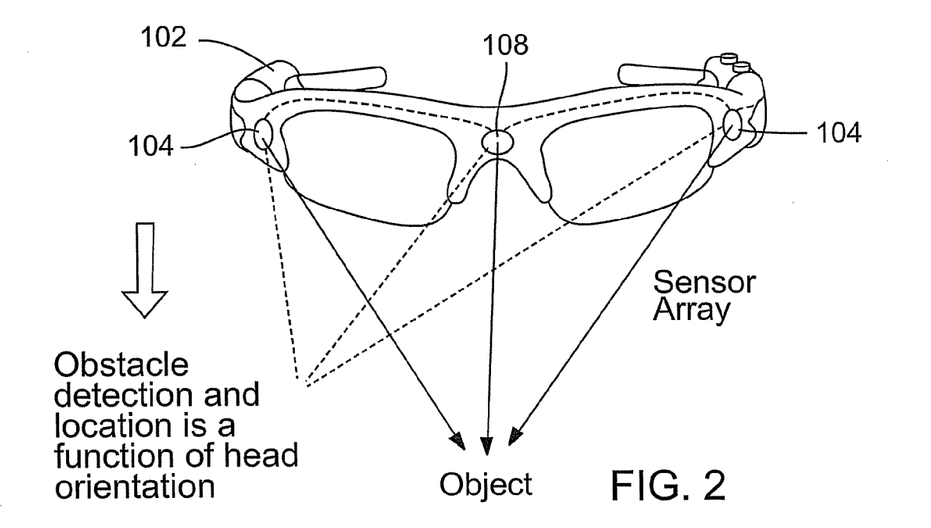
FIG. 2 illustrates a front view of the head-mounted embodiment illustrated in FIG. 1.

FIG. 2 shows one embodiment of the sunglasses 100 with a sensor array 104. It comprises optical or acoustic based transducers, any combination thereof, and/or any other sensors to perform object ranging. As one example, but not so limited, the sensor array 104 comprises ultrasonic transducers to transmit and receive ultrasonic pulses for detecting objects. The sensor array 104 includes one or more sensors that in conjunction with a controller perform ultrasonic ranging to precisely track objects within the vicinity of the user 106. The sensor array 104 detects information about where the user 106 is "looking", the user's head orientation (direction, angle, elevation), and local information, such as, the user's motion.

In this embodiment, the array of ultrasound transducers emit a unique sequence of ultrasonic bursts that includes multiple signals having different frequencies, perform processing on the echo return signals of the ultrasonic bursts, detect object distances and positions of objects in the user's environment in accordance with principles of echolocation and identify objects in the surrounding environment. The navigation system further provides the user with audible notification and feedback to guide and direct the user within the user's environment. By way of these elements, the navigation system permits the user to sonically interpret the user's environment in a manner consistent with echolocation principles.

The sensor array 104 performs echo-location to track objects within the user's environment and assist the user 106 with short-range mobility, object avoidance, and long-range navigation. The short range system identifies objects within the user's environment and provides guidance for avoiding nearby objects that are either stationary or moving along a path that may collide with the user 106 or for navigating the user 106 to a destination. Long range navigation supplements short range mobility by way of a location-determination system, such as GPS, as will be explained ahead. A view of the area in front of the sunglasses 102 is approximately a 120 degree conical section. The view may be a shape. For example, the view of the area in front of the sunglasses 102 may be a conical section of a space that is at least 60 degrees but does not exceed 120 degrees. Details of echo return signals received by the navigation system 100 can be represented in spherical co-ordinate (theta, phi) or represented in a Cartesian co-ordinate system.

The disclosed systems and methods for assisting users with guided navigation are usable in an environment in which multiple users have such a navigation system without the signals from each user interfering with one another. A unique identifier is assigned to the signal(s) transmitted by each user's device. Any suitable number of users may be present in the same environment and a different unique identifier is assigned to the signals transmitted by each user's device. Such a configuration prevents signal confusion or interference from other users' devices' signals. In some examples, the signals transmitted from a first user's device in a multi-user environment are encoded with a first unique identifier. The first user's device includes a first encoder that encodes the first user's transmitted signals with the first unique identifier, in this example. The first user's device also includes a first decoder that is coupled to the signal receiver of the first user's navigation system. The first decoder permits the signals with the first unique identifier that are received by the first navigation system to be processed by the first user's device and may prevent signals with any other unique identifier from being processed by the first user's device. In some examples, the first user's device also processes signals from another user's device so that the first user can communicate with the other user, but only permits signals with the with the first unique identifier to be processed as signals that help the first user navigate within his or her environment.

The unique identifier is any suitable unique identifier. For example, the unique identifier is a code electronically encoded within the signal(s) emitted from the user's device in some embodiments. In a more specific example, the signal(s) from the user's device are encoded with an electronic serial number, as discussed in greater detail below. In other embodiments, the unique identifier is a unique sound associated with the signal(s) transmitted from the user's device. In this example, the unique sound may be a ring tone (similar to a unique ring tone on a cellular phone) selected by the user. The user serves as the "decoder" in the sense that he or she will listen only to the signals that have his or her unique ring tone, in this example. Any suitable electronic coding of the signals emitted from the user's device may be used to assign a unique identifier to the signals. In yet other examples, a first user's device is programmable to accept signals from a second user's device such that the first user and the second user are able to communicate with each other. A first user's device may be programmable to receive signals from any other number of other user's devices. This accept/reject of other user's signals may be performed by electronic "handshaking" between the devices of any suitable form.

The user's device can sense other user's devices by any suitable means including the near range sensors (e.g., a plurality of ultrasonic transducers) and/or far range sensor(s) (e.g., GPS). The user's device has a defined limit within which the user's "environment" is defined. The defined limit or radius of space that at least partially surrounds the user is defined by the distance within which it is practical or useful for the user to know his or her surroundings. For example, the user may wish to know his or her surroundings within a conical shape of about 30 feet of the user (a typical user's forward "line of sight"). The short-range sensors in the user's device can detect other users' devices (along with the objects) within the 30 foot space and a long range sensor, GPS, can detect the user's geographical location. In this example, the GPS may determine that the user is about to encounter another user device within a range greater than the space within which the short range sensors can detect, perhaps about 100 feet, for example.

The GPS also may be used to search for another user within a particular space around the user. For example, two users being assisted by the disclosed guidance navigation systems want to find each other in a park, shopping mall, or other relatively crowded location. The GPS sensors for each of the two users can identify each user's geographical location with respect to the other user via the emitted encoded signals that uniquely identifies each user. The GPS provides each user with verbal or other audible instructions regarding the other user's geographic location and can direct the users to each other. Once both users become within range of each other's short range sensors (e.g., the ultrasound transducers), then the users are optionally able to communicate with each other over the short range transmitters and receivers (or any other suitable means).

In the system described above in which multiple users have an assisted navigation system, the multiple users' systems can use the information received from other users' systems to enhance the short-range, long-range, and object detection and avoidance capabilities of the user's system. For example, each user's assisted navigation system is able to detect signals (echoes) from their own system to detect objects within an environment and is able to detect signals from other users' systems to gain additional information about the objects within the environment. The signals received by the user's systems that are generated by other users' systems enhance the information that the user's system receives about the objects within the environment. The user's system is able to distinguish between the user's system's signals and the other signals and process the information from the other users' systems from the other users' perspective such that the user's system detects objects within the environment from many perspectives, including the user's perspective and the perspective of the other users that are sending signals.

Additionally, a database of information about an environment is compiled in one example through one or more users' systems. In this example, the database is updated when a user enters an environment with any information about the objects within the environment detected by the user's assisted navigation system. Either when that user re-enters that environment or another user enters that environment, the database can be accessed by the assisted navigation system(s) used by any user to gain additional institutional knowledge about the environment.

One or more navigation systems within close proximity to one another, for example, by way of ad-hoc and peer-to-peer communication, can adjust operational parameters to communicate amongst one another and operate without interference to each other. As an example, transmit and receive frequencies can be adjusted based on direction and distance to other sunglasses within proximity of the user. As one example, each sunglasses device can transmit a signal with an encoded serial number permitting detection filters to focus on specific returns. GPS location can be also used to determine when users of the sunglasses are in near proximity. In such cases, the users can communicate directly with other sunglasses 100 as will be described ahead, for example, through voice communication, or audible feedback.

Echolocation works like active sonar, using sounds made by the sensor array. Ranging is done by measuring the time delay between the sensor array's own sound emission and any echo signals that return from the environment. Unlike some sonar that relies on an extremely narrow beam to localize a target, the sensor array echolocation relies on multiple receivers. Referring again toe FIG. 2, the sensor array has at least two sensors positioned slightly apart. The echoes returning to the two sensors 104 arrive at different times and at different sound levels, depending on the position of the object generating the echoes. The time and level differences are used to identify direction. With echolocation the user 106 can see not only where he or she is going but can also see how big the object in front of the user 106 is and other features as well.

The sensor array 104 can comprise both narrowband and broadband ultrasound transmitters and receivers (30 to 100 KHz) (or transceivers) that localize received signals by triangulation. In this example, at least 3 broadband ultrasound receivers and 1 broadband directed source with spread of approximately 120 degree conical section can be used. Broadband signal transmission includes sending more than one signal in which at least two of the signals have different frequencies. The frequencies of these broadband signals range from 20 kHz to 100 kHz in the ultrasound range, as disclosed in the example above, or 1 GHz or more for higher frequency echo-location sensors. Any suitable type of sensor may be included in the disclosed assisted guidance navigation systems and methods. At least two of the sensors in the disclosed systems and methods emit signals having different frequencies. The receivers will receive back the "echoes" of these signals (the signals after they have encountered an object(s)) having different frequencies after they have encountered an object within the environment of the user. Such a multi-frequency system provides the user with feedback that is very realistic to the actual environment.

For example, the navigation system is able to identify objects within his/her environment and how they relate to the speed and direction at which the user is moving and the speed and direction at which the object (e.g., another person or a vehicle) is moving or the speed at which the user is approaching a stationary object. For example, the navigation system detects up to 30 objects within the user's environment. The navigation system is able to detect any suitable number of objects within the user's environment. Such a navigation system creates a "virtual" environment for the user that emulates the actual environment within which the user is moving. The "virtual" environment created for the user includes objects that produce audible feedback through echo-location with sound waves emitted from the navigation system in a three-dimensional sense with respect to the user's position and movement. The user hears a beep or other audio feedback to describe where an object is located in the environment. The beep remains constant if the user remains stationary and changes in volume and/or "location" when the user moves with respect to the object. For example, a user moving closer to an object hears a louder beeping sound as the user approaches the object. In another example, a user turning his or her head will still hear the beeping coming from the same source, which is the "virtual" equivalent to where the object is located within the user's environment.

The virtual environment is communicated to the user through audible messaging. In some examples, the user hears beeping, ringing, or other sounds that indicate that the user is approaching an object or an object is approaching the user. In some other examples, the user hears a verbal message providing the user with information relating to objects within his or her environment. In addition to the audio feedback, the user still hears the actual sound produced by the object within his or her environment (if it makes any sounds). An example of this phenomenon is a passing car that emanates sound as it physically passes a user and the echo signals created when the signals emitted by the user's navigation system encounter the car within the user's environment. The user will "hear" the car in two different ways—actual sound from the car physically passing by the user and the virtual sound that is created by the navigation system.

In this broadband example, reflection and therefore obstacle location is directly related to where the user is pointing his or her head. This can be achieved with transducers on any head-mounted device, as illustrated in FIG. 2. Configuration of the transducers may include a transmit/receive transducer 108 in a "nose rim" of an eyewear or sunglasses example, and receive transducers hidden behind what normally appears as lenses to the sunglasses. Sunglasses can contain an expansion slot to accommodate an Infrared Detection Module to allow discriminate living bodies and a magnetic compass module and an acceleration MEMS module.

Figure 3:
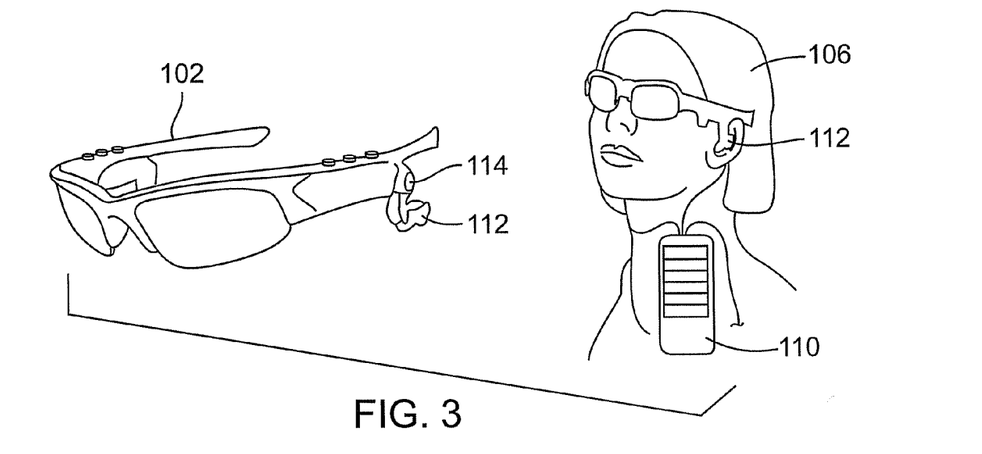
FIG. 3 illustrates another isometric view of the exemplary head-mounted embodiment of the disclosed assisted guidance navigation.

FIG. 3 shows a perspective view of the sunglasses 102 operatively coupled to a shoulder pack 110 that packages components for operation as will be described ahead. The processing module contains GPS, Electronic Compass and Ultrasonic Navigation and an echo signal detection system and is worn in the shoulder pack 110. In the current embodiment, the sunglasses 102 contain ultrasonic transducers for emitting output signals and receiving return echo signals.

The location and motion of the obstacles relative to the user 106 are communicated by a series of sound signals sent to earpieces 112 on the sunglasses 102. Audible messages emitted from the earpieces 112 identify the object and its location relative to the user 106 to help the user 106 avoid collisions with these obstacles. Auditory spatialization of sound cues provides a perceptual comprehension of the user's physical environment. The user 106 also can say voice commands to the sunglasses 102 by way of one or more microphones 114. The GPS voice activated system is used for long range navigation to guide the user 106 to a mapped location. The long-range system audibly maps out the destination and associated landmarks and tracked objects (e.g., buildings and vehicles) and may provide audible instructions that help navigate the user 106 to a destination. Any other type of long range system can be used. For example, one or more sensors, such as an accelerometer detect movement of the navigation system and can determine long-range navigation based on a pre-determined map or route. Some navigation systems include both a GPS and a sensor(s) that provide the user with long range system capabilities. In this example, if the GPS is unusable (e.g., such as in a shopping mall or tunnel), then the sensor(s) detect the movement of the navigation system and can provide long range navigation guidance to the user based on the known GPS maps or established route.

Drive and receive electronics can be contained on a printed circuit board (PCB) inside of the rim of the sunglasses 102 and contain analog interface circuitry, A/D and D/A circuits and DSP or a microprocessor and is called the "peripheral processing module". Power can be delivered via a USB cable to the processing module. The communication between the processing module and the main processor module occur via the USB cable. The sunglasses 102 contain a large capacitor for smooth energy delivery and filtering of transients from bursty operation, however all of the power can be delivered via the USB cable from the main processor unit of the shoulder pack 110.

Figure 4:
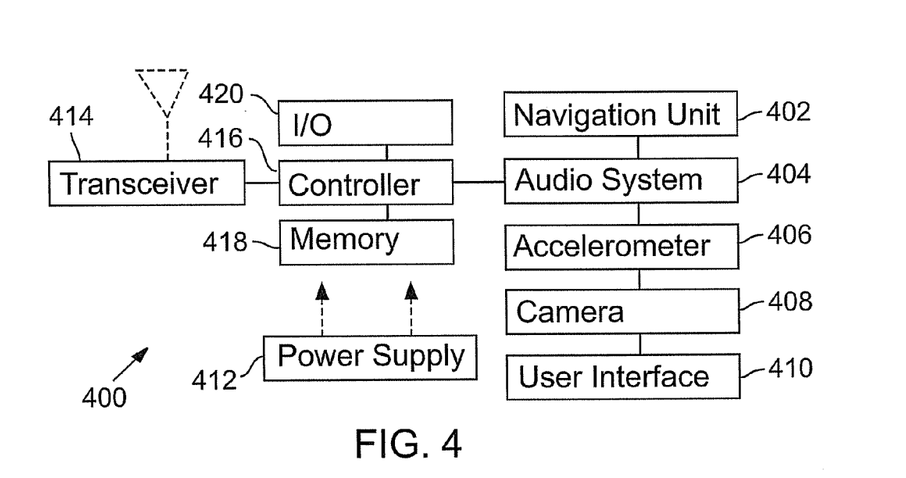
FIG. 4 illustrates a block diagram of various electronic components of the assisted guidance navigation system illustrated in FIGS. 1-3.

An exemplary component list for the navigation system is as follows, although more or less than the number of components may be constructed therein:

Processor Module with A/D and D/A and ROM & RAM
Ultrasound Transducer (e.g., placed on center rim)
Ultrasound Stereo Receiver (e.g., part of lens assembly)
Audio Stereo Earbuds (e.g., non occlusive, possible tube)
Speech pick-up with directional microphone
Sound pick-up omni-directional microphone
USB Connector to Processor Module FIG. 4 depicts an exemplary block diagram of the main processing module 400 (in an embodiment the main processing module is located in a shoulder pack). The main processor module 400 provides data, instructions and requests to the navigation system (peripheral processing module). The peripheral processing module responds with acknowledgements and an executed request and provides resulting data to the main processing module 400. As illustrated in FIG. 4, the main processing module 400 includes a navigation unit 402 that combines ultrasonic ranging for short-range navigation (adaptive up to 50 feet) with a voice activated GPS location system for long-range navigation and guidance.

By way of the audio system 404, location and motion of the obstacles relative to the user are communicated by a series of sound signals sent to audible feedback on the navigation system. The audio system 404 generates these audible messages to identify the object and its location relative to the user to help the user avoid collisions with the objects. Moreover, the audio system 404 provides auditory spatialization of sound cues to provide a perceptual comprehension of the user's physical environment.

The audio system 404 also includes voice recognition capabilities that recognize voice directives from the user by way of a microphone. By way of this voice recognition, the user can issue voice commands to interact with the navigation system. For instance, the user can request information such as location or direction data, directions, map updates, time sensitive data, or perform voice communication functions such as placing a phone call, retrieving voice mail, or sending voice mail.

The navigation system can utilize known technology such as a GPS (Global Positioning System) receiver that can intercept satellite signals and therefrom determine a location fix of the navigation system. The combined GPS voice activated system is used for long-range navigation to guide the user to a mapped location, and provides programming and control functions. The long range system maps out the destination and associated landmarks and tracked objects on the path to the destination (e.g., points of interest, restaurants, stores, libraries, hospitals, etc.) and provides audible instruction to help the user navigate to the destination and avoid objects within the user's path (or avoid objects that are likely to cross the user's path). The navigation system in addition to GPS functionality further comprises a magnetic orientation module that operates on the earth's magnetic field.

The main processing module 400 also includes an accelerometer 406 that measures the acceleration it experiences relative to gravity or motion. Single- and multi-axis MEMS models detect magnitude and direction of the acceleration as a vector quantity, and can be used to sense orientation, vibration and/or shock. By way of the accelerometer 406 the navigation system can determine it the user abruptly moves or falls for emergency response reporting. It can also sense rotation of the navigation system.

The main processing module 400 also includes a camera 408 that records images, either as a still photograph or as video. The navigation system can process the images for identifying relevant information in the user's environment such as objects in the near vicinity. Through this process, the navigation system may optionally be able to identify the type of object(s) within the user's environment. This can include identifying the type of object (e.g., building, car, person, etc.).

The main processing module 400 also includes a user interface 410 that permits the user to interact and operate the navigation system. The user interface 410 can comprise an electronic Braille keypad that is electronically coupled to the navigation system or located peripheral to the navigation system on an external module such as a shoulder pack. In conjunction with the audio system 404, the user interface 410 can instruct the user through a set of prompts.

The main processing module 400 also includes a power supply 412 that utilizes common power management technologies such as replaceable batteries, supply regulation technologies, and charging system technologies for supplying energy to any components of the navigation system and to facilitate portable applications. In stationary applications, the power supply 412 can be modified so as to extract energy from a common wall outlet and thereby supply DC power to the components of the navigation system.

In a wireless communications setting, a transceiver 414 of the main processing module 400 (or expansion slot) can utilize common technologies to support individually or in combination any number of wireless access technologies including, but not limited to, cordless phone technology (e.g., DECT), Bluetooth™ 802.15, Wireless 802.11a/b/g/n, Worldwide Internet access 802.16, Ultra Wide Band (UWB), software defined radio (SDR), and cellular access technologies such as CDMA-1x, W-CDMA/HSDPA, GSM/GPRS, TDMA/EDGE, and EVDO. SDR can be utilized for accessing a public or private communication spectrum according to any number of communication protocols that can be dynamically downloaded over-the-air to the terminal device (e.g., the sunglasses). It should be noted also that next generation wireless access technologies can be applied to the present disclosure.

The main processing module 400 also includes a controller 416 that utilizes computing technologies such as a microprocessor and/or a digital signal processor (DSP) with associated storage memory 418 such a Flash, ROM, RAM, SRAM, DRAM or other like technologies for controlling operations of the aforementioned components of the terminal device. The Input/Output 420 permits portable exchange of information or data for instance by way of a Universal Serial Bus (USB). As one example, the controller 416 can be an embedded platform running an operating system (OS), such as Windows Mobile® or Android®. In the latter, Java (compiled) can interface over Linux.

Figure 5:
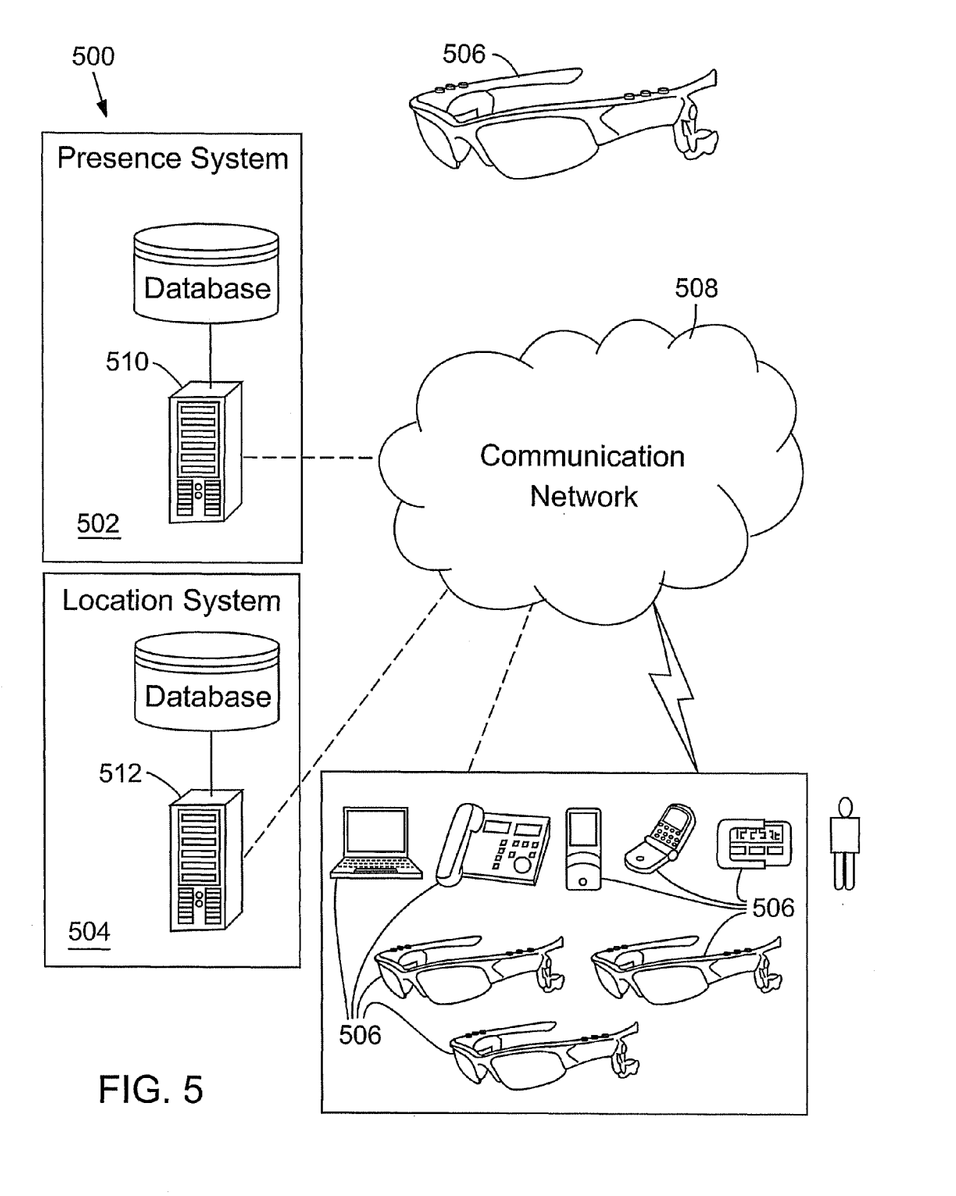
FIG. 5 illustrates an example of a head-mounted embodiment of the assisted guidance navigation system within a networked environment.
Figure 6:
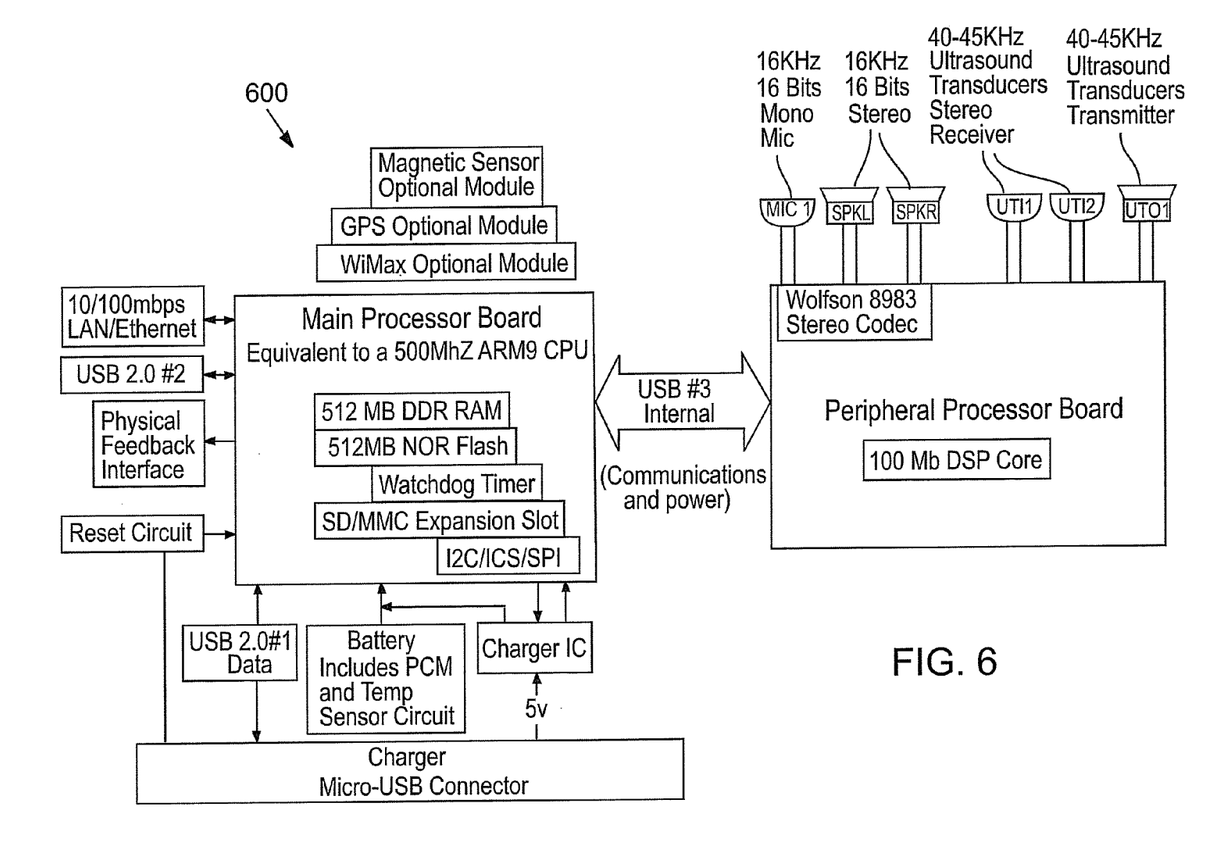
FIG. 6 illustrates an example of an assisted guidance navigation system within a communications environment.

FIG. 5 depicts an exemplary block diagram for the navigation system according to the following example:

Size:
Dimensions 113×59×23 mm
Weight 178 g
Display:
Braille keypad 65K colors Size 320×320 pixels
44×44 mm
Accelerometer sensor for auto-rotate
Navigation:
Touch screen
Backlit QWERTY keyboard
Five-way navigation button architecture
Camera:
3.15 MP, 2048×1536 pixels, autofocus, video, secondary VGA videocall camera
Memory:
128 MB of memory (64 MB of RAM and 64 MB of Flash ROM)
24 MB built-in user available memory
CPU:
Intel's® PXA270 running at 312 MHz (Pentium D®)
Expansion Slots:
MiniSD, SD/MMC (+SDIO)
Modular plug-in SD card for future expansion
OS:
Standard Windows Mobile®
External Interfaces:
Mini USB for downloads, maintenance and charging (Slave USB, Power IN)
Audio, 2.5 mm diameter earphone/microphone jack with stereo sound
Battery:
Removable
Rechargeable Li-Ion battery
Stand-by: Up to 300 h
Run time: Up to 6 h
Charger:
Input: 90~240 V AC, 50/60 Hz
Output: USB Fast Charge.
Country Certifications Required:
North America, EMC and Safety
UK, EMC, Safety. RoHS and WEEE
EU, EMC, Safety. RoHS and WEEE
Taiwan, Japan, Korea, HK, Japan, EMC and other specific compliance requirements, e.g. PSE
China, EMC, Safety, and other specific compliance requirements e.g. CCC
Operating Conditions:
Ambient temperature of 0° C. to +55° C.
Relative humidity in the range of 10% and 90% non-condensing
Abrasion resistance
Water resistance
Storage Conditions:
Storage temperature in the range of −40° C. to +85° C.
Packaging:
Bulk
Retail
Accessories
Documentation
Options:
Customized GPS 16 as an add on option
802.16 as an add on option FIG. 6 depicts an exemplary embodiment of a communication system 600. FIG. 6 is a specific example of the communication system illustrated in FIG. 5. Ranges of various components in FIG. 6 are different in other exemplary embodiments. For example, in an alternative example, the transducers are electrodynamic transducers within a range of 30-90 kHz. Referring again to FIG. 5, the communication system 500 can comprise a presence system 502, a location system 504, and one or more terminal devices 506 coupled through a communication network 508. The foregoing components 502-508 of the communication system 500 can utilize common computing and communications technologies to support circuit-switched and/or packet-switched communications.

The presence system 502 can be utilized to track the whereabouts and status of the user communicating with one or more of the terminal devices 506 in the communications network 508. For example, users of navigation system (in this example, sunglasses) can detect each other in a multi-user environment. In the arrangement shown, the presence system 502 can include a controller element 510 that supplies system presence information associated with the user. The controller element 510 can initiate a communication session with a communication device identified in the communication system 500 to supply the called party with presence information.

The location system 504 can be utilized to identify a location of the user with the sunglasses 506. In the arrangement shown, the location system 504 includes a controller element 512 that initiates a data session with a global positioning system (GPS). The controller element 512 may be a processor, a programmable storage medium, a server, or any other suitable communication component.

The communication supplied by the user or a calling party can include a caller ID retrieved from a call initiated by the calling party over the communication network 508 utilizing common means, and/or a voicemail message supplied thereby. The location system 504 can identify the calling party via caller identification (ID). The location system 504 can also record a communication identifier associated with the communication device of the called party, such as a caller ID. In such regard, the location system 504 can provide contact information of the calling party and/or the called party to the presence system 502. The location system 504 may include technology such as found in an interactive voice response (IVR) system for interacting with the calling and called parties utilizing voice and keyed input signals (e.g., DTMF tones), and for processing a voice mail message supplied by the calling party according to a particular call flow design.

The presence and location systems 502, 504 can be provisioned to interact cooperatively to enhance processing of location and communication information. In particular, the location system 504 can record a message supplied by the user directed to a called party, and initiate an interactive communication session with a communication device (e.g., sunglasses 506) of the called party to supply the voice message.

The communication network 508 comprises a number of common network elements interconnected by wired or wireless interfaces that support packet-switched and/or circuit-switched technologies. The communications network 508 can thus offer terminal devices 506 Internet and/or traditional voice services such as, for example, POTS (Plain Old Telephone Service), Public Switched Telephone Network (PSTN), VoIP (Voice over Internet Protocol) communications, IPTV (Internet Protocol Television), broadband communications, cellular telephony, as well as other known or next generation access technologies.

The terminal devices 506 can represent any number of embodiments including without limitation a laptop or desktop computer, other sunglasses, a POTS phone, a personal digital assistance (PDA), a cellular phone, or paging device, just to name a few. Some or all of these devices can interface with the communication network 508 with a wired or wireless interface. For example, the laptop can be interconnected to the communications network 508 by a wired Ethernet port to a DSL (Digital Service Line) interface in a residence or enterprise, or by an IEEE802.x Wireless Local Area Network (WLAN), Wireless Fidelity (WiFi) or Worldwide Interoperability for Microwave Access (WiMAX) wireless connection. Optionally, the laptop can be interconnected to the communications network 508 using any other wireless technology including GSM/GPRS. The POTS phone can utilize cordless 2.4 GHz or 5.8 GHz technology for short-range roaming, and interface to the communications network 508 using POTS or VoIP communications. The PDA and cellular phone can support common wireless access technologies for interfacing to the communications network 508. Any of these technologies optionally may be coupled with a camera that provides video feedback on request. For example, a micro video camera can provide video feedback upon request via a GSM/GPRS or WiMAX connection to the communications network 508. This feedback can be used by a remote assistance service so that a remote operator (human or a computer) is able to help navigate the user by providing feedback based on the operator's view of the user's environment.

Additionally, functions of the aforementioned terminal devices 506 in FIG. 5 can be combined so as to create a multifunctional or multimode communication device. For example, VoIP, paging, email, calendaring, WiFi, WiMAX, and cellular communication functionality of location determination of the user can be integrated into the PDA. FIG. 6 illustrates an exemplary embodiment of a navigation system 600 that embodies features of the navigation systems illustrated in FIGS. 1-5.

Figure 7:
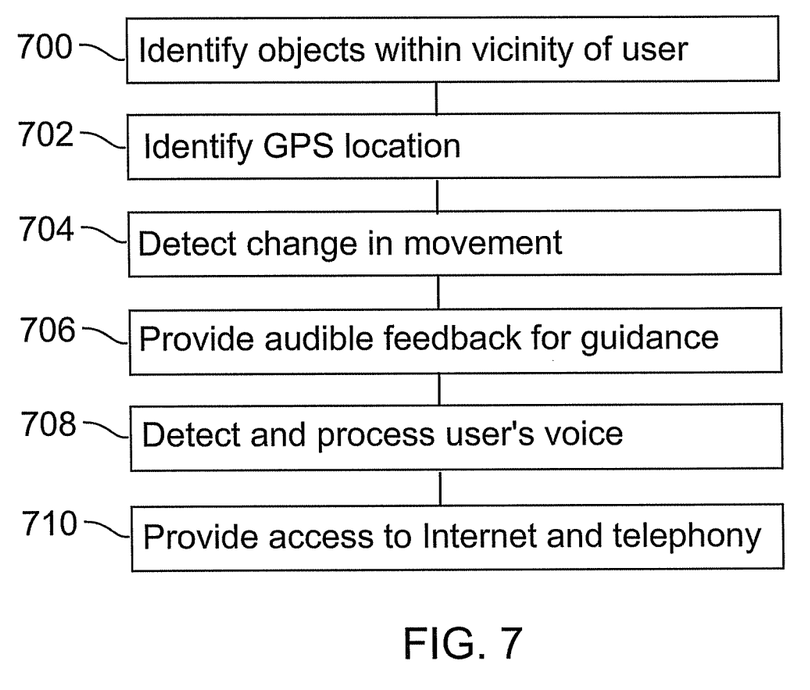
FIG. 7 illustrates steps of a method for providing assisted guidance navigation in accordance with aspects of the disclosure.

FIG. 7 depicts an exemplary method for assisted guidance navigation by way of the navigation system and a communications system. The method can be practiced with more or less than the number of steps shown and is not limited to the order shown. The method begins at step 700 in which the navigation system identifies objects within the vicinity of the user. The objects are identified relative to the user's head orientation in the head-mounted (e.g., sunglasses) example. As previously noted, the sensor array identifies features of objects (e.g., size, stationarity, density, etc.) within proximity of the user.

At step 702 the navigation system identifies the user's location through a GPS. As an example, the GPS location is used in conjunction with the object location from the previous step to identify landmarks. For instance, Google Maps by way of the communication system indicates GPS locations of buildings and landmarks that are evaluated against features of the detected objects. The GPS is also used to track the whereabouts and the direction of the user, for instance, if the user has reached a destination entered in by way of the user interface. In an example, the GPS identifies that a geographic location of the user is near a government building. The short-range sensors detect a large building-like structure within the user's environment. The navigation system identifies the large building-like structure as the government building based on the information from the GPS and the short-range sensors.

At step 704 the navigation system detects change(s) in movement of the user, for example, by way of the accelerometer and can flag an interrupt based on the movement. For instance, upon detecting an abrupt movement possibly caused by a fall or accident, on an otherwise smoothly continuous path to a destination, the navigation system can detect a possible emergency event by way of the communication system.

At step 706 the navigation system provides audible feedback for guidance in coordination with the object detection and GPS location. Continuing with the example above, the navigation system can generate audible messages to ask the user if the abrupt event was intentional or accidental and respond accordingly. Audible feedback can also include occasionally informing the user of their whereabouts or directions to a destination. Audible feedback also can be coupled with cellular voice processing systems for example to permit the user to accept incoming phone calls, check voice mail, or listen to music. Notably, the voice calls or music can be temporarily interrupted in response to detecting an abrupt change in movement or other possible danger, such as detecting a street crossing by way of GPS or maps, detecting other fast-moving objects within the user's environment, detecting a possible emergency event, or the like.

At step 708 the navigation system detects and processes the user's voice, either in directed commands or natural voice. For instance, the user can speak a command to inquire about an object detected by the navigation system, speak a command to receive directions, speak to place a phone call, or speak to send a voice message. The navigation system optionally includes, or is electronically coupled to, a voice recognition system that can process the user's voice, in a command style or natural speaking style. The navigation system may include any suitable voice recognition system.

At step 710 the navigation system can provide access to the Internet and telephony by way of the communication system. In an example, downloaded or on-line data can be audibly coupled to an earpiece of the sunglasses to provide the user with audible information, such as, map information, business information, residential or commercial information, transportation information (subway, buses, taxis, trains, airplanes and automobiles, etc.), weather information, traffic information, or any other relevant data to the users destination or position as determined by the GPS.

An additional exemplary specification is provided below:
Software Modules:
  Linux+Device drivers in Main Processor.
  Interface to Peripheral processor.
  VR module is software algorithm running in DSP.
  Virtual Audio Multiplexing can be software module residing in Peripheral
  Processor module and recombines normal audio sent from Main Processor with processed virtual audio generated on Peripheral Processor from instructions sent by Main Processor.
Security:
  Peripheral Processor can have a "unique hardware KEY" for stream encryption and decryption of data between Main Board.
  When first time configured, Main Processor can connect to service site for registration and will send "KEY".
  Service center can send program with embedded KEY and therefore disable operation with other KEY substitutes.
  KEY information can be hidden
  Program can terminate its operation after time expiry etc., requiring re-program.
Peripheral Processor:
  Can use a Capacitor>100 mF (physical size will be the factor) (in addition to USB power and instead of battery) to reduce activity related power noise
  Can receive micro-commands and provide responses, 16 KHz/16 bit acquisition (mono) microphone for commands, 40-100 KHz mono transmission (1 channel) and acquisition (3+ channels) for 16 KHz/16 bit stereo audio delivery and serial stream encryption and decryption. DSP of 80-100 MIP's may suffice.
  Virtual audio is processed on peripheral board with "vector instructions" from main board.

VR is "voice recognition" multiplexing of information relating to mixing of virtual sound produced by the peripheral board and "instructions" sent from main module. These instructions can be from GPS etc.

I/O:
- Out: 2 channels 16 KHz/16 bit stereo speakers, inputs are multiplexed from main board reception of normal stereo and virtual processed on peripheral board.
- Out: 1 channel 40-100 KHz ultrasound transducer, signals encoded with "unique hardware KEY" to discriminate every user in a multi-user environment.
- In: 1 16 KHz/16 bit mono microphone digitized and send to VR software module on main.
- In: 3 stereo 40-100 KHz Ultrasound transducers, digitized partial processing and send to main for further processing. Echo signal returns accepted only for "unique hardware KEY" to discriminate for only own returns (to filter out other users' signals in a multi-user environment).

Basic Processor to/from Peripheral:
- View the functionality as digital USB stream to and from peripheral board and on board A/D and D/A functionality.
- Can be powered by USB and can have some self power (e.g., capacitor)
- 1 channel of 16 KHz/16 bit for analog in and digital transfer for Voice Recognition engine.
- 2 channels for digital input and after processing analog outputs, audio earbuds.
- For 40-100 KHz 1 channel for digital input and after processing analog output for signal drive, 3 channels of analog input and digital transfer.
- 3 independent channels and 2 pairs of dependent channels
- Rugged but not ruggedized, to be worn.
- Temperature range is from −20° C. to +70° C. and operation can be fanless
- Shock and Vibration components (e.g., motor)
- Water proofing added (e.g., sealing).

The following section describes acoustic features of a sensor array with respect to frequency and temporal features of the transmit and receive sensor signals. It is the variations in these aspects that produce echolocation signals suited for different acoustic environments and ranging.

Frequency Modulation and Constant Frequency: Echolocation calls can be composed of two different types of frequency structures: frequency modulated (FM) sweeps, and constant frequency (CF) tones. A particular call can consist of one, the other, or both structures. An FM sweep is a broadband signal—that is, it contains a downward sweep through a range of frequencies. A CF tone is a narrowband signal: the sound stays constant at one frequency throughout its duration.

Intensity: Echolocation calls have been measured at intensities anywhere between 60 and 110 decibels. The call intensity can be modified mid-call, lowering the intensity as the user approaches objects that reflect sound strongly.

Harmonic composition: Calls can be composed of one frequency, or multiple frequencies comprising a harmonic series. In the latter case, the call is usually dominated by a certain harmonic ("dominant" frequencies are those present at higher intensities than other harmonics present in the call).

Call duration: A single echolocation call (a call being a single continuous trace on a sound spectrogram, and a series of calls comprising a sequence or pass) can last anywhere from 0.2 to 100 milliseconds in duration, depending on the environment. For example, the duration of a call can decrease when the user is approaching an object—this enables the sensor array to call more rapidly without overlap of call and echo. Reducing duration comes at the cost of having less total sound available for reflecting off objects and being received or detected by the sensor array.

Pulse interval: The time interval between subsequent echolocation calls (or pulses) determines two aspects of perception. First, it establishes how quickly the sensor array auditory scene information is updated. Secondly, the pulse interval determines the maximum range for which the sensor array can detect objects. For example, a pulse interval of 100 ms allows sound to travel in air roughly 34 meters for detecting objects as far away as 17 meters (the sound has to travel out and back). With a pulse interval of 5 ms, the sensor array can only detect objects up to 85 cm away. Therefore the sensor array constantly has to make a choice between getting new information updated quickly and detecting objects far away.

Figure 8:
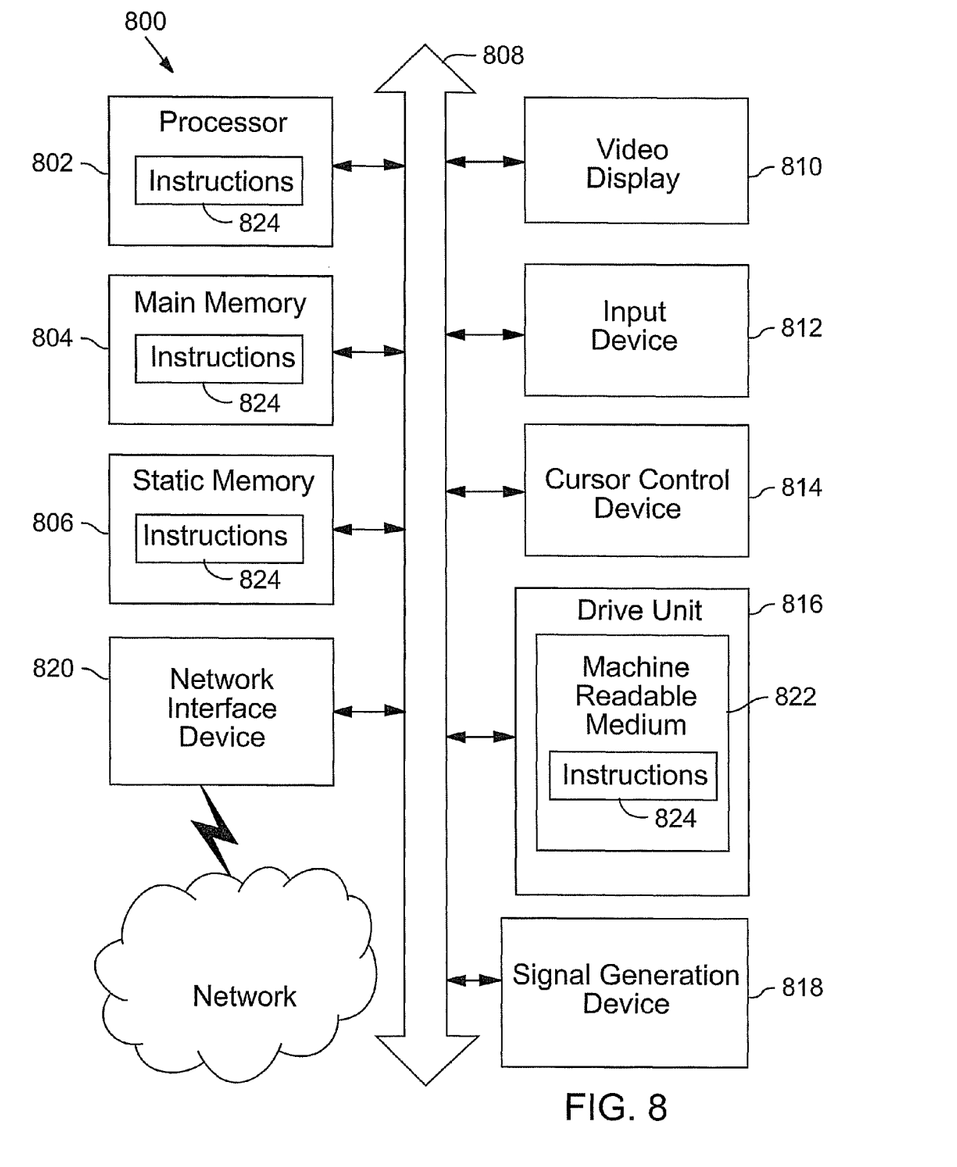
FIG. 8 illustrates an exemplary computer system capable of executing machine-executable instructions in accordance with aspects of the disclosed assisted guidance navigation system.

FIG. 8 depicts an exemplary schematic diagram of a machine in the form of a computer system 800 within which a set of instructions, when executed, may cause the machine to perform any one or more of the methodologies discussed above. In some embodiments, the machine operates as a standalone device. In other embodiments, the machine is connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 800 may include a processor 802 (e.g., a central processing unit, a graphics processing unit, or both, a main memory 804 and a static memory 806, which communicate with each other via a bus 808. The computer system 800 may further include a video display unit 810 (e.g., a liquid crystal display (LCD), a flat panel, a solid state display, or a cathode ray tube (CRT), or the like). The computer system 800 may include an input device 812 (e.g., a keyboard or voice recognition and interpretation module), a cursor control device 814 (e.g., a mouse), a disk drive unit 816, a signal generation device 818 (e.g., a speaker or remote control) and a network interface device 820.

The disk drive unit 816 may include a machine-readable medium 822 on which is stored one or more sets of instructions 824 (e.g., software) embodying any one or more of the methodologies or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but are not limited to, distributed processing or component/object distributed processing, parallel processing, or virtual machine processing can also be constructed to implement the methods described herein.

The present disclosure contemplates a machine readable medium containing instructions, or that which receives and executes instructions from a propagated signal so that a device connected to a network environment can send or receive voice, video or data, and to communicate over the network using the instructions. The instructions may further be transmitted or received over a network via the network interface device.

While the machine-readable medium is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" also may be taken to include any medium that is capable of storing, encoding or carrying a set of instructions for execution by the machine and that causes the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Optional features may be added to any of the aspects of the assisted guidance navigation described above. For example, headphones with speaker and microphone capabilities may be included in the navigation system to help the users communicate with their navigation systems with verbal instructions or commands. The users also may communicate with their navigation systems through wireless speakers and microphones, keyboards, or any other input device. An Mp3 player or other audio player or radio may be incorporated into the navigation system for entertaining the user. Decorative features such as various colors and styles of the navigation system may be incorporated, as suitable for the user. Any suitable optional features may be included in the navigation system.

Similarly, individual elements or features of a particular aspect of the assisted guidance navigation are generally not limited to that particular aspect, but, where applicable, are interchangeable and can be used in a selected aspect, even if not specifically shown or described. The same also may be varied in many ways. Such variations are not to be regarded as a departure from the invention, and all such modifications are intended to be included within the scope of the invention.

The examples described above relate to applications of the invention that assist the visually-impaired. The disclosed assisted navigation systems are useful in many other applications as well. For example, users attempting to navigate in an environment with limited visibility will find the disclosed assisted guidance navigation systems useful. For example, the military, firefighters, and other entering environments with low visibility would find this navigation system very useful. In examples in which users without vision impairment (or without extreme vision impairment) use the disclosed assisted guidance navigation system, the feedback provided to the user can be any suitable feedback, including visual feedback including but not limited to photos, video, light bursts, and the like. Any combination of visual, audio, and touch (e.g., vibration) feedback can be used in any of the embodiments of the disclosed assisted navigation systems.

I claim:
1. A navigation system, comprising:
   a plurality of spaced apart short range echo-location sensors, at least two sensors in conjunction with each other configured to triangulate upon objects within a user's environment at a single point in time to determine infor- mation relating to the objects within the user's environment and information relating to avoiding objects within the user's environment;

at least one long range navigation sensor that determines geographical information relating to the user's geographic location;

wherein the information relating to the objects within the user's environment, the information relating to avoiding objects within the user's environment, and the geographical information relating to the user's geographic location are provided to the user by a wearable transducer.

2. The navigation system of claim 1, wherein the plurality of spaced apart short range echo-location sensors are head-mounted to the user.

3. The navigation system of claim 1, wherein the plurality of short range echo-location sensors includes at least one ultrasonic transducer.

4. The navigation system of claim 1, wherein the plurality of short range echo-location sensors receive at least a first signal having a first frequency and a second signal having a second frequency that is different than the first frequency.

5. The navigation system of claim 1, wherein the user's environment includes a space that is up to 20 meters from the user.

6. The navigation system of claim 1, wherein the information relating to avoiding objects within the user's environment includes providing the user with information regarding the user's potential to collide with at least one object and instructions to the user regarding how to avoid the collision.

7. The navigation system of claim 1, wherein the information relating to avoiding objects within the user's environment includes providing the user with information regarding the user's potential to collide with at least one object and information relating to the user's position with respect to the at least one object and the velocity of the object with respect to the user.

8. The navigation system of claim 7, wherein the velocity of the at least one object is zero.

9. The navigation system of claim 7, wherein the velocity of the at least one object is non-zero.

10. The navigation system of claim 1, wherein the user's environment includes a plurality of objects and the navigation system selects at least a first object from within the plurality of objects to provide information to the user relating to avoiding the first object based at least in part on the user's proximity and likelihood of collision with the first object.

11. The navigation system of claim 1, wherein the at least one long range navigation sensor includes a global positioning system.

12. The navigation system of claim 1, wherein the long range navigation system further provides the user with information regarding navigating to a destination based at least in part on the user's geographic location.

13. The navigation system of claim 1, wherein the transducer provides audible feedback to the user.

14. The navigation system of claim 13, wherein the audible feedback includes at least one tone.

15. The navigation system of claim 13, wherein the audible feedback includes verbal feedback.

16. The navigation system of claim 1, wherein said objects within a user's environment are detected by the navigation system through echo location.

17. A navigation system, comprising:

a plurality of spaced-apart short range multiple-frequency receiving sensors that detect objects within a user's environment by triangulation at a single point in time to determine information relating to the objects within the user's environment and information relating to avoiding objects within the user's environment;

at least one long range navigation sensor that determines geographical information relating to the user's geographic location; and, wherein the information relating to the objects within the user's environment, the information relating to avoiding objects within the user's environment, and the geographical information relating to the user's geographic location are provided to the user by a wearable transducer.

18. The navigation system of claim 17, wherein the plurality of spaced-apart short range multiple-frequency receiving sensors are worn on the head of the user.

19. The navigation system of claim 17, wherein the plurality of short range multiple-frequency receiving sensors includes at least one ultrasonic transducer.

20. The navigation system of claim 17, wherein said multiple-frequency sensors are broadband ultrasound receivers that operate within a range from 20 kHz to 100 kHz.

21. The navigation system of claim 17, wherein said multiple-frequency sensors operate at or above frequencies of 1 GHz.

* * * * *